United States Patent
Sun et al.

(10) Patent No.: US 8,582,550 B2
(45) Date of Patent: Nov. 12, 2013

(54) BOUNDED POWER-SAVE-POLLING (BPS)

(75) Inventors: Yanjun Sun, Richardson, TX (US); Ariton E. Xhafa, Plano, TX (US); Xiaolin Lu, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 875 days.

(21) Appl. No.: 12/562,421

(22) Filed: Sep. 18, 2009

(65) Prior Publication Data

US 2010/0067424 A1    Mar. 18, 2010

Related U.S. Application Data

(60) Provisional application No. 61/098,106, filed on Sep. 18, 2008.

(51) Int. Cl.
    *H04J 3/16*    (2006.01)
(52) U.S. Cl.
    USPC ........................................................ 370/346
(58) Field of Classification Search
    USPC ........................................................ 370/364
    See application file for complete search history.

(56) References Cited

U.S. PATENT DOCUMENTS

| | | | | |
|---|---|---|---|---|
| 7,656,853 | B2* | 2/2010 | Albulet | 370/346 |
| 8,073,388 | B2* | 12/2011 | Grushkevich et al. | 455/41.2 |
| 2003/0137986 | A1* | 7/2003 | Kaku et al. | 370/449 |
| 2008/0123582 | A1* | 5/2008 | Maekawa | 370/315 |
| 2008/0279264 | A1* | 11/2008 | Desai et al. | 375/220 |
| 2010/0184420 | A1* | 7/2010 | Reinhold et al. | 455/418 |

OTHER PUBLICATIONS

"BCM4325 Bluetooth© and WLAN Coexistence," Broadcom Corporation, Aug. 2008, 18 pages.

* cited by examiner

*Primary Examiner* — Mark Rinehart
*Assistant Examiner* — Maharishi Khirodhar
(74) *Attorney, Agent, or Firm* — Steven A. Shaw; W. James Brady; Frederick J. Telecky, Jr.

(57) ABSTRACT

In accordance with at least some embodiments, a system comprises an access point and a station in communication with the access point. The station has at least two network technology subsystems subject to coexistence interference. The station selectively implements bounded Power Save (PS)-Polling (BPS) logic to handle communications between the station and the access point. The BPS logic operates to confine PS-Poll transmissions starts to one of two separate windows during a medium grant duration of the station.

11 Claims, 5 Drawing Sheets

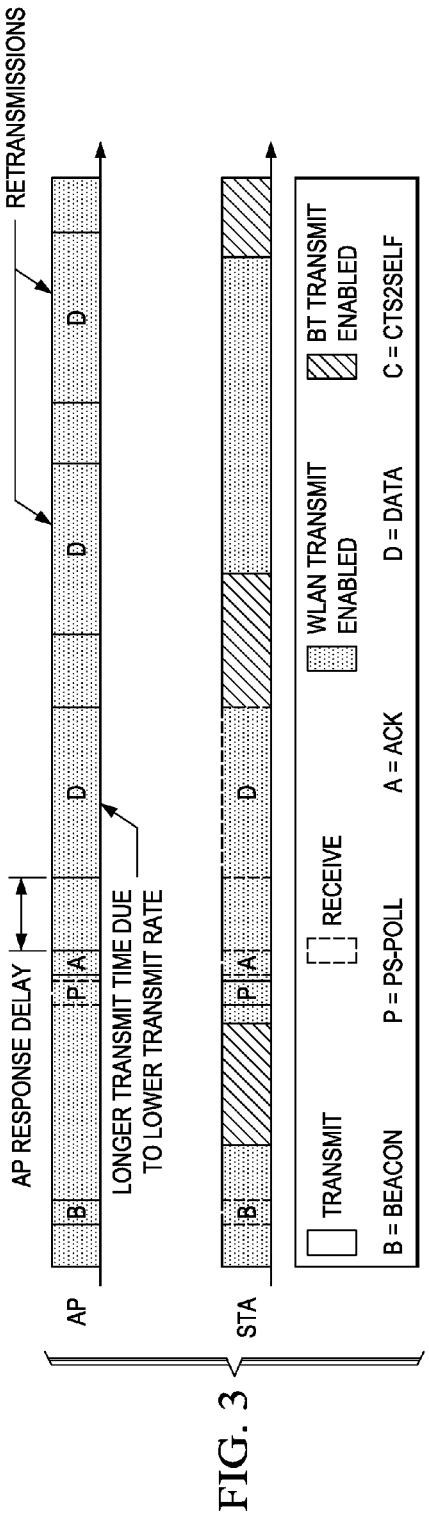
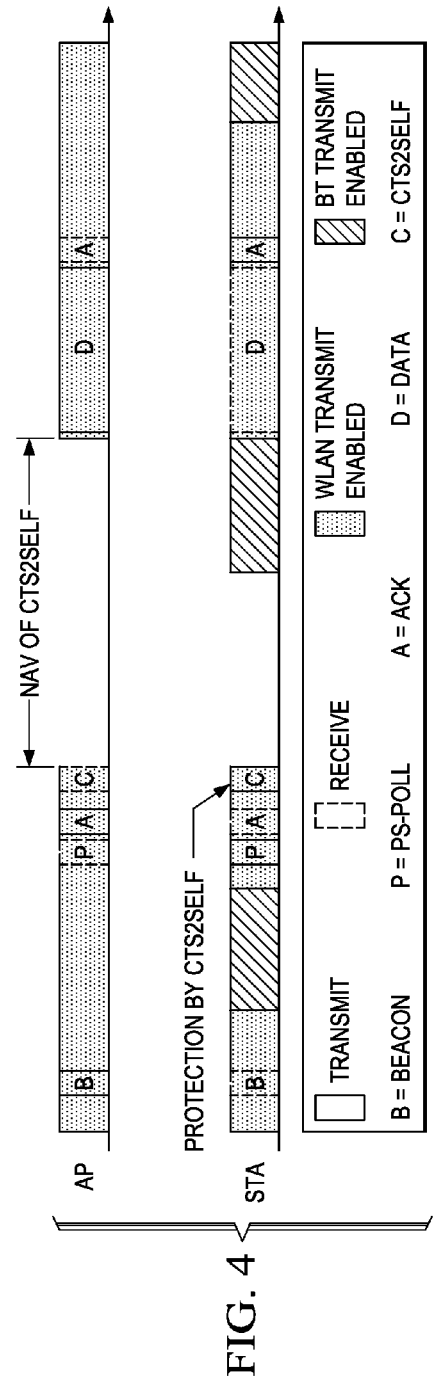

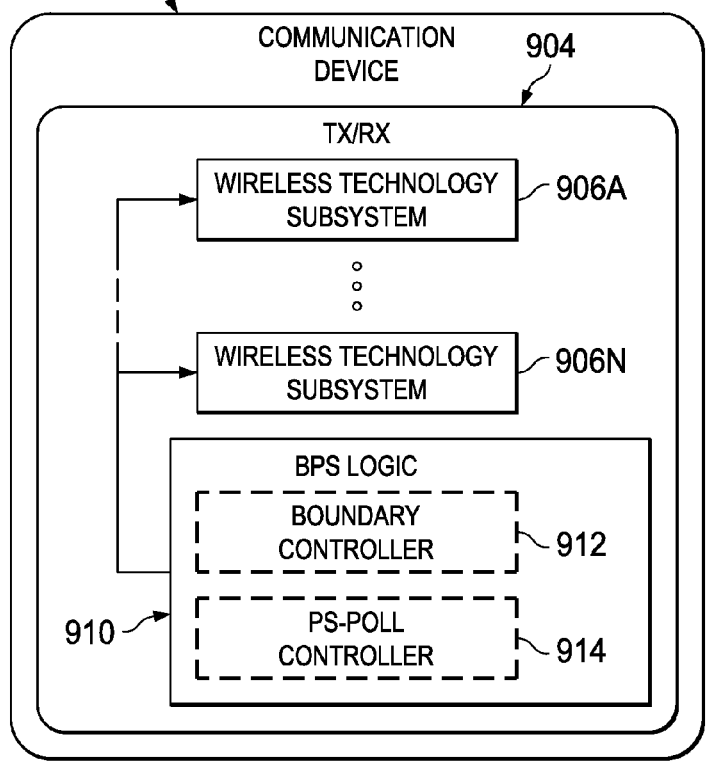
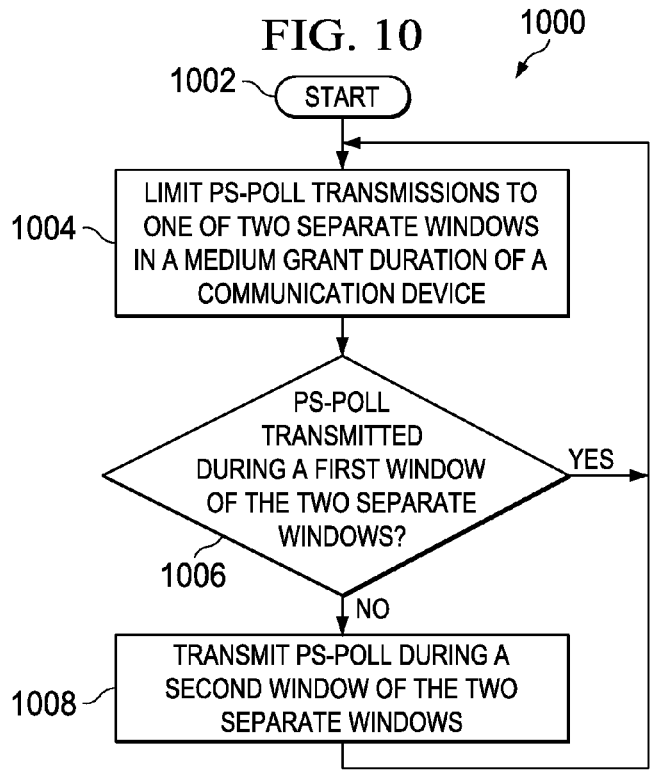

BOUNDED POWER-SAVE-POLLING (BPS)

CROSS-REFERENCE TO RELATED APPLICATIONS

This application is a non-provisional application claiming priority to provisional application Ser. No. 61/098,106, filed on Sep. 18, 2008, entitled "BPS: Bounded PS-Poll Transmissions in Coexisting Wireless Networks," the teachings of which are incorporated by reference herein.

BACKGROUND

Next generation mobile devices implement a plurality of wireless technologies to access different networks such as WiMAX networks, WLAN networks, LTE networks, Wireless USB or Bluetooth (BT) networks, etc. Such devices are referred to herein as "combo" devices. While increased access to these technologies benefit users and operators alike, interference among different technologies, particularly onboard a single combo device, introduces difficulties during concurrent operation of these technologies. For example, and as illustrated in FIG. 1, WLAN (in 2.4-2.5 GHz) and WiMAX (2.3-2.4 GHz and 2.5-2.7 GHz) technologies operate at relatively close frequency bands with respect to each other—so close, in fact, that the out-of-band emission by either technology may saturate the receiver of the other technology resulting in potential blocking. Thus, the interference between different technologies operating in the same combo device creates coexistence problems.

Time multiplexed operation has been proposed coordinate BT radio and WLAN radio in a single mobile device (co-existence node). Under such operation, the CTS2Self mechanism may be used to protect both BT and WLAN performance in order to avoid the avalanche effect (TI Connectivity Solutions: "WiMAX/WLAN and BT coexistence", 2007). The protection mechanism using CTS2Self frames, however, could greatly reduce the channel utilization of WLAN, as a CTS2Self frame disables transmissions from all WLAN neighbors during the following BT activity. For example, if the BT radio has HV3 traffic and a co-existence node generates a CTS2Self frame once every 3.75 ms, the resulting channel utilization is less than 67% because transmissions from neighbors are disabled for at least 1.25 ms. Channel utilization could be worse when CTS2Self based protection is used by multiple mobile devices associated with the same AP.

In order to reduce the number of CTS2Self frames generated while avoiding the avalanche effect, a scheme that takes advantage of Power Save (PS) mode has been proposed. FIG. 2 shows this scheme in which a co-existence node (STA) stays in PS mode so that WLAN Access Point (AP) cannot transmit a data packet to the STA without having received a PS-Poll frame from the STA first. As shown in FIG. 2, after the STA has received a beacon indicating a pending data to the STA at the AP, the STA transmits a PS-Poll to notify the AP that it is active to receive the data. Upon receiving this PS-Poll, the AP replies with an ACK after a SIFS delay. Then the data is sent at AP's convenience and the STA confirms a successful receipt with an ACK. Although the 802.11 standard allows an AP to reply to the PS-Poll with a data instead of the ACK as in FIG. 2 (802.11 Spec), most products take the approach shown in FIG. 2 for better protection of the data transmission and lower complexity in implementation. Since the AP cannot transmit any data before receiving a PS-Poll from the STA, no CTS2Self frame is needed and the avalanche effect is avoided.

In WLAN networks, the AP response time and adaptive rate control can make PS-Poll-based transmissions less efficient. Most deployed APs cannot start data transmission immediately after sending an ACK in response to the received PS-Poll packet. There is often a delay of several hundreds of microseconds before an AP starts the transmission, and this depends on implementation of the AP and traffic loads at the AP. Such delays are herein referred to as "AP response delay". Another important factor for PS-Poll efficiency is adaptive rate control at the AP. A lower PHY data rate used for data transmission results in longer data transmission time. Such long transmission times, in addition to the AP response delay, make it harder for a PS-Poll-ACK-Data-ACK sequence to be completed between two consecutive BT activities. FIG. 3 illustrates a scenario in which the AP response delay and long data transmission times result in data transmission failure. As shown in FIG. 3, a STA has no time to respond with an ACK before the STA grants the medium to the BT radio, and thus data retransmissions from the AP that overlap with BT activity will fail.

CTS2Self can be used to delay a data transmission so that it is not interrupted by BT activities (see FIG. 4). This gain, however, is at the cost of poor channel utilization. In order to delay the data transmission from the AP, a CTS2Self has to be sent before the data transmission starts from the AP. Since the size and arrival time of the data frame are unpredictable, the latest time the CTS2Self should be transmitted is a calculable time (e.g., $T_{MaxData}+SIFS+T_{ACK}$) before the medium is granted to BT. Here $T_{MaxData}$ is the duration to transmit a data packet of maximum size and $T_{ACK}$ is the duration to transmit an ACK. As an example, $T_{MaxData}$ for a data packet of 1500 Bytes may be more than 2 ms at the data transmission rate of 6M bps. Further, with a 1.2 ms time period of BT activity, the CTS2Self needs to extend the network allocation vector (NAV) at the AP by more than 3.2 ms. All STAs in the WLAN overhearing this CTS2Self will set their NAV accordingly and refrain from transmitting during this time. In this scenario, the network's channel utilization will be greatly reduced if such CTS2Self frames are transmitted often.

SUMMARY

In at least some embodiments, a system includes an access point and a station in communication with the access point. The station has at least two network technology subsystems subject to coexistence interference. The station selectively implements bounded Power-Save-Polling (BPS) logic to handle communications between the station and the access point. The BPS logic operates to confine PS-Poll transmissions to one of two separate windows during a medium grant duration of the station.

In at least some embodiments, a communication device include a transceiver with a first wireless technology subsystem and a second wireless technology subsystem, the first and second wireless technology subsystems being subject to coexistence interference. To avoid an avalanche effect and improve channel utilization, the transceiver includes logic that selectively bounds Power-Save (PS)-Poll transmissions to one of two separate windows during a medium grant duration of the communication device.

In at least some embodiments, a method for a communication device includes limiting Power-Save (PS)-Poll transmissions to one of two separate windows in a medium grant duration of the communication device. If a PS-Poll is not transmitted during a first window of said two separate windows, the method includes transmitting a PS-Poll during a second window of said two separate windows.

BRIEF DESCRIPTION OF THE DRAWINGS

For a detailed description of exemplary embodiments of the invention, reference will now be made to the accompanying drawings in which:

FIG. 3 illustrates a scenario that leads to a failed data delivery;

FIG. 4 illustrates use of a CTS2Self transmission to avoid interruption of data delivery;

FIG. 9 illustrates a simplified communication device in accordance with an embodiment of the disclosure; and FIG. 10 shows a method for a communication device in accordance with an embodiment of the disclosure.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. The term "system" refers to a collection of two or more hardware and/or software components, and may be used to refer to an electronic device or devices or a sub-system thereof. Further, the term "software" includes any executable code capable of running on a processor, regardless of the media used to store the software. Thus, code stored in non-volatile memory, and sometimes referred to as "embedded firmware," is included within the definition of software.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Embodiments of the disclosure are directed to communication systems having at least one "combo" device (i.e., a device having at least two dissimilar network technology subsystems that are subject to coexistence interference). As used herein, "coexistence interference" refers to interference that occurs during simultaneous emissions (e.g., out-of-band emissions by either technology may saturate the receiver of the other technology resulting in potential blocking). To avoid the avalanche effect in the combo device, embodiments of the disclosure employ a bounded PS-Poll (BPS) technique that controls when PS-Poll transmission starts. In accordance with at least some embodiments, BPS causes PS-Poll transmission to occur as early as possible if data delivery can be finished before a Bluetooth (BT) radio takes over the medium. Otherwise, BPS postpones PS-Poll transmission to occur as late as possible so that the duration of the CTS2Self is minimized.

Figure 1:
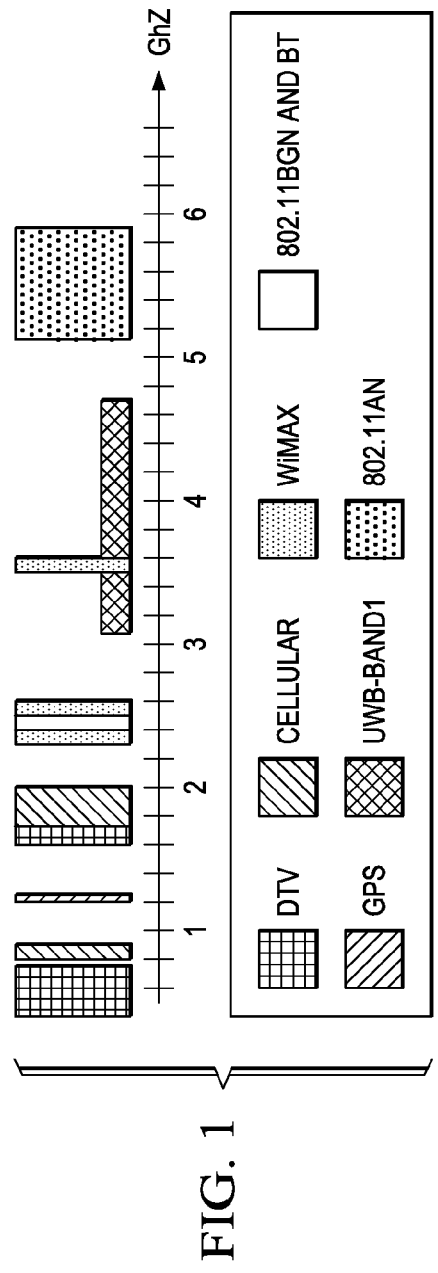
FIG. 1 illustrates different network technologies and their operating bands.
Figure 2:
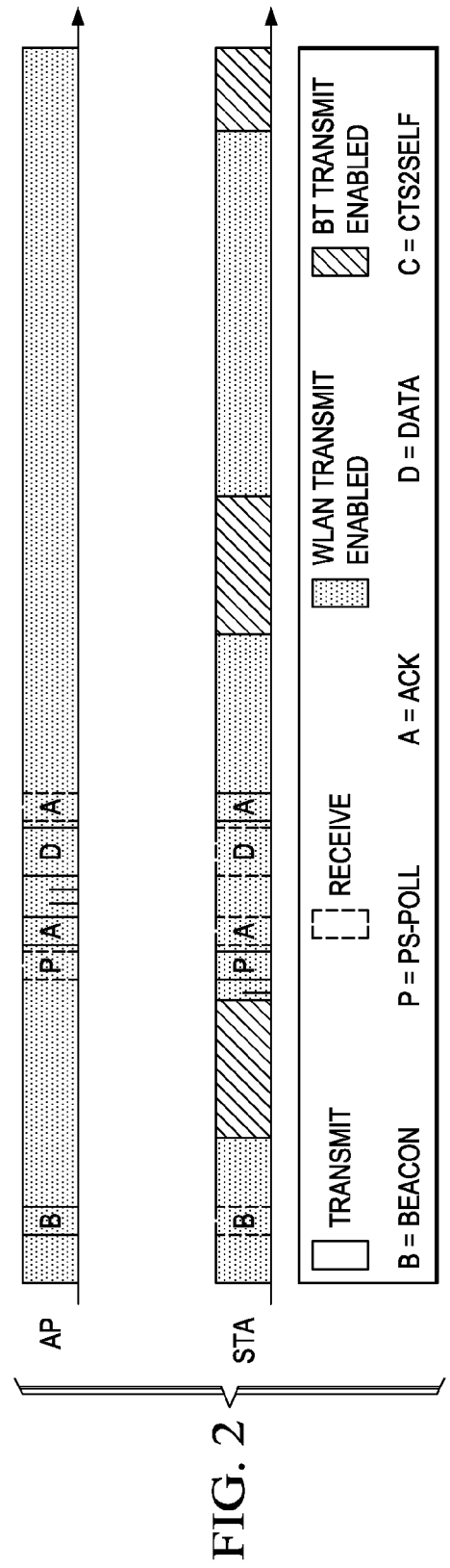
FIG. 2 illustrates a Power Save (PS) mode scheme that avoids CTS2Self.
Figure 5:
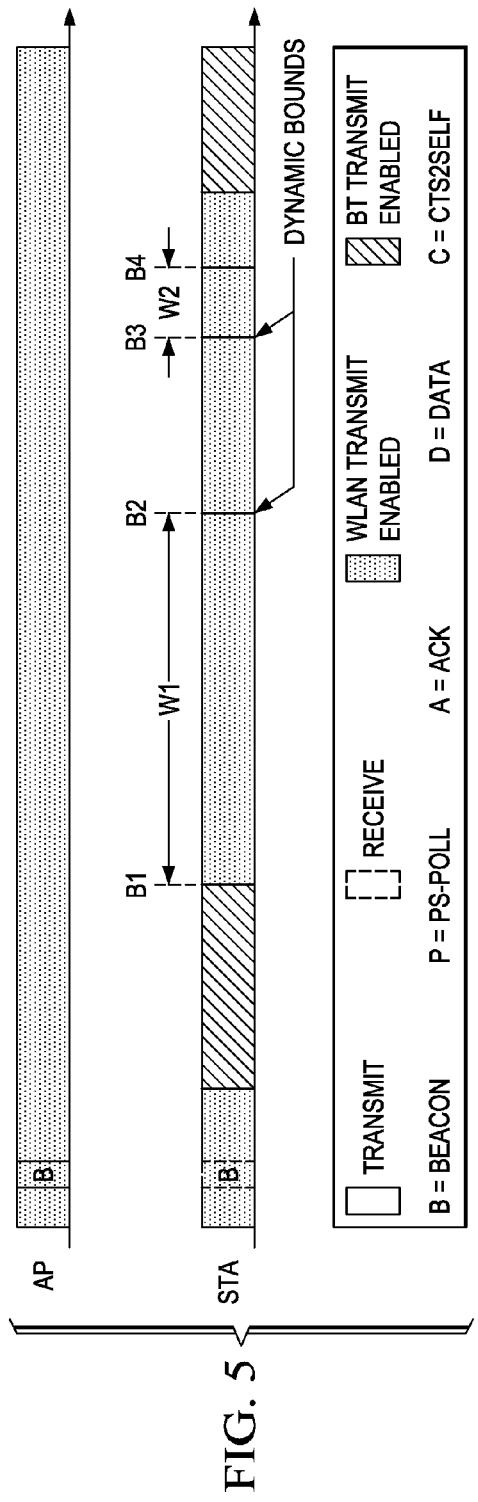
FIG. 5 illustrates a Bounded PS-Poll (BPS) technique in accordance with an embodiment of the disclosure.

FIG. 5 illustrates a BPS technique in accordance with an embodiment of the disclosure. In FIG. 5, the BPS technique involves determining the location of 2 windows ("W1" and "W2") during the time interval that a WLAN STA is granted the medium. The boundaries for W1 are B1 and B2. Meanwhile, the boundaries for W2 are B3 and B4. In accordance with at least some embodiments of BPS, B1 and B4 are fixed while B2 and B3 are dynamically adjusted. More specifically, the disclosed BPS technique may adjust B2 so that it is likely for the AP to finish delivering a data unit during the WLAN medium grant duration if a PS-Poll transmission starts within W1. The disclosed BPS technique also may adjust B3 so that a PS-Poll-ACK-CTS2Self sequence or a CTS2Self-PS-Poll-ACK sequence may be completed within the WLAN medium grant duration if a PS-Poll transmission starts within W2.

In accordance with BPS, scheduling of PS-Poll transmissions is based on W1 and W2. If a PS-Poll can start within W1 window, BPS starts PS-Poll transmission immediately, in order to minimize the use of CTS2Self frames. Otherwise, BPS postpones the PS-Poll transmission until the W2 window. In the postponed transmission, a CTS2Self is generated immediately after an ACK is received. In this way, the NAV duration set by sending a CTS2Self frame is minimized.

In at least some embodiments, B1 always starts from the beginning of the WLAN medium grant duration. Meanwhile, B4 is at calculable time (e.g., $T_{PS\text{-}Poll}+SIFS+T_{ACK}+SIFS+T_{CTS}$) before the medium is granted to next BT activity. In this example, $T_{PS\text{-}Poll}$ is the duration to transmit a PS-Poll and $T_{CTS}$ is the duration to transmit a CTS2Self. In other words, the B4 value is chosen so that a CTS2Self can always be transmitted if an ACK is received in response to a transmitted PS-Poll packet. Although the embodiment of FIG. 5 focuses on the scenario where a CTS2Self is transmitted after the PS-Poll-ACK exchange, similar logic may also be applied to another scenario where a CTS2Self is transmitted immediately before the PS-Poll-ACK exchange. In the latter scenario, the CTS2Self will start within the W2 window.

Figure 6:
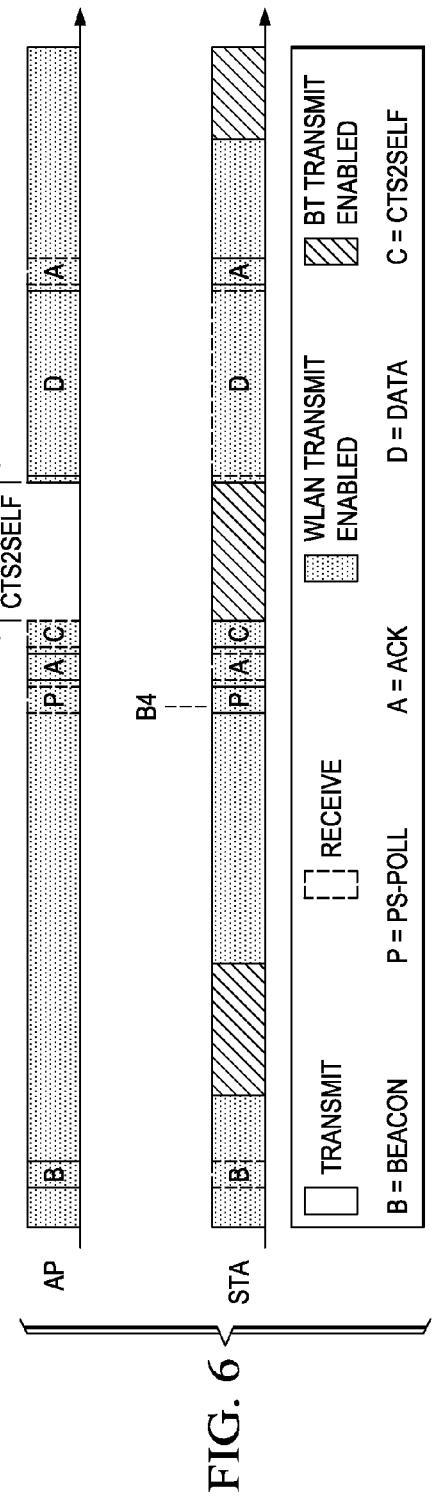
FIG. 6 illustrates use of a CTS2Self transmission with the BPS technique in accordance with an embodiment of the disclosure.

FIG. 6 illustrates use of a CTS2Self transmission with the BPS technique in accordance with an embodiment of the disclosure. As shown in FIG. 6, a PS-Poll is transmitted just before B4 while the rest of the frame exchange, including the ACK frame and CTS2Self frame are transmitted after B4. In this example, the NAV duration of the CTS2Self is just slightly longer than the length of the BT activity. The PS-Poll-ACK-CTS2Self sequence of FIG. 6 can also be replaced with a CTS2Self-PS-Poll-ACK sequence (still with SIFS as the interval between each frame in the sequence), which is not illustrated in the FIG. 6.

In at least some embodiments, heuristics are used to dynamically maintain the B2 and B3 values. If the STA starts PS-Poll transmission within W1 window and Data-ACK exchange is also completed within the WLAN medium grant duration, then B2 is moved away from B1. Otherwise, B2 is moved towards B1. Further, if the sizes of data frames vary, data packet arrival times and sizes may be estimated to determine whether a larger data packet size can be successfully acknowledged within the WLAN medium grant duration (e.g., before the medium is granted to the BT radio).

The B3 value is also adjusted dynamically since a STA may not be able to transmit a PS-Poll right at B4. If a PS-Poll is successfully acknowledged within a given W2, B3 may be moved closer to B4 (to shrink W2) in order to reduce the duration set by the CTS2Self. Otherwise, B3 is moved away from B4 (expanding W2) to increase the success rate of PS-Poll transmissions.

As previously noted, BPS can be applied to combo devices (e.g., a device with WLAN/BT technologies). The benefits of BPS implementation include avoidance of avalanche effect in the WLAN network, and greater channel utilization for WLAN nodes (compared to existing schemes) by avoiding use of CTS2Self and by reducing the duration of unavoidable CTS2Self frames.

Figure 7:
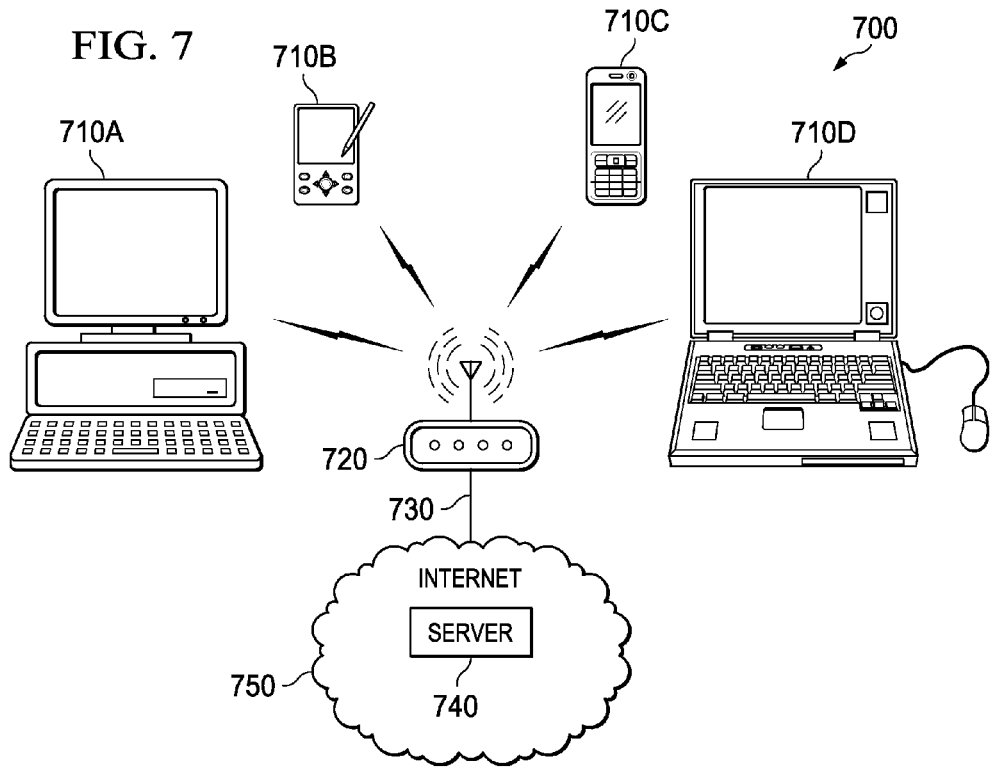
FIG. 7 illustrates a wireless local area network (WLAN) in accordance with an embodiment of the disclosure.

FIG. 7 illustrates a wireless local area network (WLAN) 700 in accordance with an embodiment of the disclosure. To provide wireless data and/or communication services (e.g., telephone services, Internet services, data services, messaging services, instant messaging services, electronic mail (email) services, chat services, video services, audio services, gaming services, etc.), the WLAN 700 comprises an access point (AP) 720 and any of a variety of fixed-location and/or mobile wireless devices or stations (STAs) (referred to individually herein as device, station, STA or device/station), four of which are respectively designated in FIG. 7 with reference numerals 710A, 710B, 710C and 710D. It should be appreciated that the network 700 is meant to be illustrative and not exhaustive. For example, it should be appreciated that more, different or fewer communication systems, devices and/or paths may be used to implement embodiments. Exemplary devices 710 include any variety of personal computer (PC) 710A with wireless communication capabilities, a personal digital assistant (PDA) or MP3 player 710B, a wireless telephone 710C (e.g., a cellular phone, a smart phone, etc.), and a laptop computer 710D with wireless communication capabilities. At least one of AP 720 and STAs 710A-710D are preferably implemented in accordance with at least one wired and/or wireless communication standard (e.g., from the IEEE 802.11 family of standards). Further, at least one device 710 comprises a combo device with a plurality of wireless network technology subsystems onboard.

In the example of FIG. 7, to enable the plurality of devices/STAs 710A-710D to communicate with devices and/or servers located outside WLAN 700, AP 720 is communicatively coupled via any of a variety of communication paths 730 to, for example, any of a variety of servers 740 associated with public and/or private network(s) such as the Internet 750. Server 740 may be used to provide, receive and/or deliver services such as data, video, audio, telephone, gaming, Internet, messaging, electronic mail, or other services. Additionally or alternatively, WLAN 700 may be communicatively coupled to any of a variety of public, private and/or enterprise communication network(s), computer(s), workstation(s) and/or server(s) to provide any of a variety of voice service(s), data service(s) and/or communication service(s).

In accordance with at least some embodiments, at least one of the STAs 710A-710D is a combo device that implements the disclosed BPS technique (i.e., the combo device is a "BPS STA". A BPS STA implements BPS logic to handle communications between the BPS STA and the access point 720. More specifically, BPS logic may perform various operations such as confine PS-Poll transmissions from the BPS STA to the access point 720 to one of two separate windows during a medium grant duration of the BPS STA. More specifically, the BPS logic maintains a first window of the two separate windows in the medium grant duration, where the first window is used to control when a PS-Poll is transmitted so that a data transmission is competed during the medium grant duration. In at least some embodiments, the first window has a first boundary approximately aligned with a start of the medium grant duration and a second boundary that is adjustable. As an example, the second boundary of the first window may be adjusted towards the first boundary of the first window if a previously attempted PS-Poll transmission and corresponding data transmission cannot be completed during the medium grant duration (i.e., the size of the first window is reduced). On the other hand, the second boundary of the first window may be adjusted away from the first boundary of the first window if a previously attempted PS-Poll transmission and corresponding data transmission are completed during the medium grant duration (i.e., the size of the first window is increased).

The BPS logic also maintains a second window of the two separate windows in the medium grant duration, where the second window is used to control when a PS-Poll is transmitted if a PS-Poll transmission cannot be completed during the first window. In at least some embodiments, the second window has a first boundary that is adjustable and a second boundary that is fixed. As an example, the second boundary of the second window may be determined by a predetermined end of the medium grant duration and a duration for the PS-Poll-ACK-CTS2Self sequence as discussed previously. Meanwhile, the first boundary of the second window may be adjusted towards the second boundary of the second window if a previously attempted PS-Poll transmission during the second window is successfully acknowledged (i.e., the size of the second window is reduced). On the other hand, the first boundary of the second window may be adjusted away from the second boundary of the second window if a previously attempted PS-Poll transmission during the second window is not successfully acknowledged (i.e., the size of the second window is increased).

Figure 8:
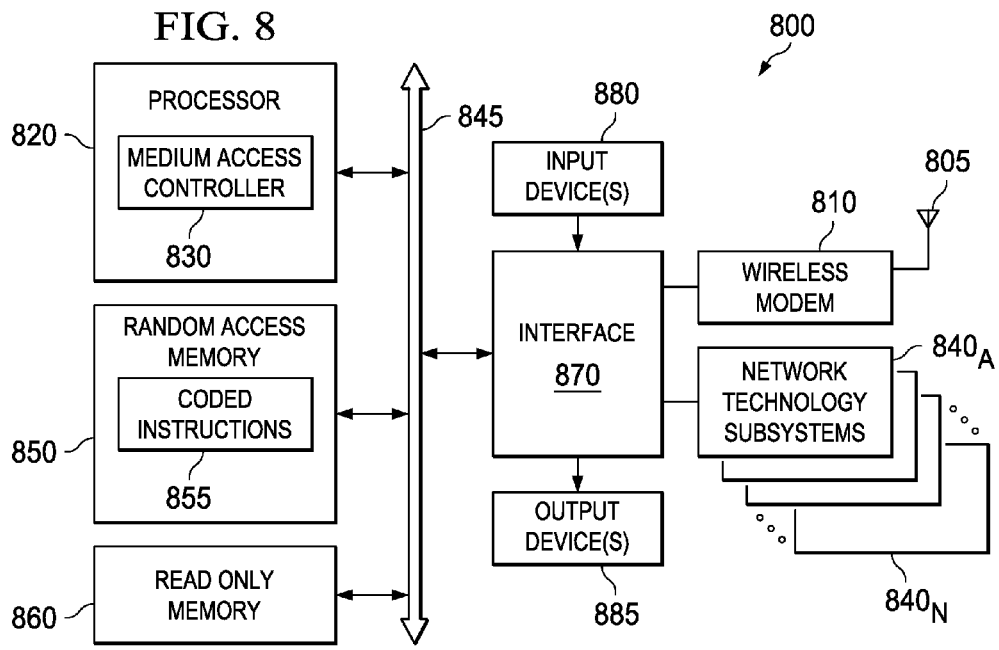
FIG. 8 illustrates an exemplary access point and/or wireless device in accordance with an embodiment of the disclosure.

The BPS technique described herein may be implemented on any general-purpose computer with sufficient processing power, memory resources, and network throughput capability to handle the necessary workload placed upon it. FIG. 8 illustrates a device 800 comprising an exemplary general-purpose computer system that may correspond to a combo device that implements the BPS technique. In FIG. 8, the device 800 may be, for example, an access point or other wireless device. It should be expressly understood that any device on, for example, WLAN 700 or other embodiments, may at times be an access point and at other times be a station. It should also be understood that in some embodiments, there may be at least one dedicated access point, with any number of devices acting as stations.

As shown, the device 800 comprises at least one of any of a variety of radio frequency (RF) antennas 805 and any of a variety of wireless modems 810 that support wireless signals, wireless protocols and/or wireless communications (e.g., according to IEEE 802.11n). RF antenna 805 and wireless modem 810 are able to receive, demodulate and decode WLAN signals transmitted in a wireless network. Likewise, wireless modem 810 and RF antenna 805 are able to encode, modulate and transmit wireless signals from device 800 to other devices of a wireless network. Thus, RF antenna 805 and wireless modem 810 collectively implement the "physical layer" (PHY) for device 800. It should be appreciated that device 800 is communicatively coupled to at least one other device and/or network (e.g., a local area network (LAN), the Internet 250, or other devices). It should further be understood that illustrated antenna 805 represents one or more antennas, while the illustrated wireless modem 810 represents one or more wireless modems.

The device 800 further comprises processor(s) 820. It should be appreciated that processor 820 may be at least one of a variety of processors such as, for example, a microprocessor, a microcontroller, a central processor unit (CPU), a main processing unit (MPU), a digital signal processor (DSP), an advanced reduced instruction set computing (RISC) machine, an (ARM) processor, etc. Processor 820 executes coded instructions 855 which may be present in a main memory of the processor 820 (e.g., within a random-access memory (RAM) 850) and/or within an on-board memory of the processor 820. Processor 820 communicates with memory (including RAM 850 and read-only memory (ROM) 860) via bus 845. RAM 850 may be implemented by dynamic RAM (DRAM), synchronous dynamic RAM (SDRAM), and/or any other type of RAM device. ROM 860 may be implemented by flash memory and/or any other type of memory device.

Processor 820 implements MAC 830 using one or more of any of a variety of software, firmware, processing thread(s) and/or subroutine(s). MAC 830 provides medium access controller (MAC) functionality and further implements, executes and/or carries out functionality to facilitate, direct and/or cooperate in avoiding avalanche effect. In accordance with at least some embodiments, the MAC 830 avoids the avalanche effect by employing the BPS technique. The MAC 830 is implemented by executing one or more of a variety of software, firmware, processing thread(s) and/or subroutine(s) with the example processor 820. Further, the MAC 830 may be, additionally or alternatively, implemented by hardware, software, firmware or a combination thereof, including using an application specific integrated circuit (ASIC), a programmable logic device (PLD), a field programmable logic device (FPLD), discrete logic, etc.

The device 800 also preferably comprises at least one input device 880 (e.g., keyboard, touchpad, buttons, keypad, switches, dials, mouse, track-ball, voice recognizer, card reader, paper tape reader, etc.) and at least one output device 885 (e.g., liquid crystal display (LCD), printer, video monitor, touch screen display, a light-emitting diode (LED), etc.)—each of which are communicatively connected to interface 870.

As shown, interface 870 also communicatively couples a wireless modem 810 with the processor 820 and/or the MAC 830. Interface 870 provides an interface to, for example and not by way of limitation, Ethernet cards, universal serial bus (USB), token ring cards, fiber distributed data interface (FDDI) cards, network interface cards, wireless local area network (WLAN) cards, or other devices that enable device 800 to communicate with other devices and/or to communicate via Internet 750 or intranet. With such a network connection, it is contemplated that processor(s) 820 would be able to receive information from at least one type of network technology and/or output information to at least one type of network technology in the course of performing the herein-described processes. It should be appreciated that interface 870 may implement at least one of a variety of interfaces, such as en external memory interface, serial port, communication internal to device 800, general purpose input/output (I/O), etc.

As shown in FIG. 8, the device 800 comprises network technology subsystems $840_A$-$840_N$, where N is the number network technology subsystems in device 800. In accordance with embodiments, device 800 comprises at least two dissimilar network technology subsystems 840. As a result, device 800 is said to have coexisting network technologies. "Dissimilar" is used in this context to mean that at least one of the subsystems 840 is from a different network technology than another one of the subsystems 840. It should be understood that some embodiments of subsystems 840 may have their own dedicated wireless modem and antenna, while other embodiments may share either or both of a wireless modem and antenna. Examples of network technologies that may be represented by such subsystems include, but are not limited to, worldwide interoperability for microwave access (WiMAX) networks, wireless local area network (WLAN) networks, long term evolution (LTE) mobile telephony networks, personal area networks (PANs), wireless universal serial bus (USB) networks, BLUETOOTH (BT) networks, ZigBee/IEEE 801.15.4, etc. In accordance with embodiments, processor 820 interacts with network technology subsystems 840 via interfaces implemented by interface 870. It should be appreciated that, for the ease of illustration, only two or three such network technologies may be discussed in connection with any particular embodiment. However, the techniques described herein apply equally to devices having other amounts of technologies onboard a device.

FIG. 9 illustrates a simplified communication device 902 in accordance with an embodiment of the disclosure. The communication device 902 is representative of a combo device as described herein. As shown, the communication device 902 comprises a transceiver (TX/RX) 904 having a plurality of wireless technology subsystems 906A-906N. At least two of the wireless technology subsystems 906A-906N operate at relatively close or overlapping frequency bands with respect to each other such that coexistence interference occurs during simultaneous emissions (e.g., out-of-band emissions by either technology may saturate the receiver of the other technology resulting in potential blocking). To compensate for such coexistence interference and to avoid the avalanche effect, the transceiver 904 comprises BPS logic 910. In general, the BPS logic 910 selectively bounds Power-Save (PS)-Poll transmission starts to one of two separate windows of a medium grant duration of the communication device 902. To achieve this, the BPS logic 910 comprises a boundary controller 912 and a PS-Poll controller 914. The BPS logic 910 may be implemented, for example, by a media access control (MAC) layer of the transceiver 904.

In accordance with at least some embodiments, the boundary controller 912 determines first and second boundaries for a first window of the two separate windows in the medium grant duration, the first boundary being fixed and the second boundary being adjustable. During operation, the boundary controller 912 may adjust the second boundary of the first window towards the first boundary of the first window if a previously attempted PS-Poll transmission and corresponding data transmission cannot be completed during the medium grant duration. Alternatively, boundary controller 912 may adjust the second boundary of the first window away from the first boundary of the first window if a previously attempted PS-Poll transmission and corresponding data transmission are completed during the medium grant duration.

In accordance with at least some embodiments, the boundary controller 912 also determines first and second boundaries for a second window of the two separate windows in the medium grant duration, the first boundary being adjustable and the second boundary being fixed. As an example, the boundary controller 912 may fix the second boundary of the second window based on a predetermined end of the medium grant duration and a PS-Poll-ACK-CTS2Self sequence duration. Furthermore, the boundary controller 912 may adjust the first boundary of the second window towards the second boundary of the second window if a previously attempted PS-Poll transmission during the second window is successfully acknowledged. Alternatively, the boundary controller 912 may adjust the first boundary of the second window away from the second boundary of the second window if a previously attempted PS-Poll transmission during the second window is not successfully acknowledged.

The PS-Poll controller 914 operates in conjunction with the boundary controller 912 to confine PS-Poll transmissions to the first and second windows maintained by the boundary controller 912. In accordance with embodiments, the BPS logic 910 maintains the first and second windows for each of a plurality of medium grant durations of the communication device 902. For multiple medium grant durations, BT activity and related traffic flows may affect the size of the medium grant durations. However, as long as the medium grant durations are predictable the disclosed BPS technique may be applied by the BPS logic 910. As an example, the BPS logic 910 may record B1 and B4 in terms of offsets from the boundaries of the medium grant duration. Meanwhile, B2 and B3 may be recorded in terms of offset from B1 and B4 respectively. In this manner, B1, B2, B3 and B4 will be automatically updated when a medium grant duration changes. If the medium grant duration is too short and B2 occurs at a latter time than B3, previous rules defined for W2 can be applied for a transmission that starts within the overlapped region between W1 and W2.

FIG. 10 shows a method 1000 for a communication device (e.g., a combo device such as communication device 902) in accordance with an embodiment of the disclosure. As shown, the method 1000 starts at block 1002 and continues by limiting PS-Poll transmission starts to one of two separate windows in a medium grant duration of the communication device (block 1004). If a PS-Poll is not transmitted during a first window of the two separate windows (determination block 1006), the method 1000 may comprise starting the transmission of a PS-Poll during a second window of the two separate windows (block 1008) before returning to block 1004. If a PS-Poll is transmitted during a first window of the two separate windows (determination block 1006), the method 1000 returns to block 1004.

In accordance with at least some embodiments, the method 1000 may comprise additional steps that are added individually or in combination. For example, the method 1000 may additionally comprise fixing a first boundary of the first window and adjusting a second boundary of the first window. The method 1000 may additionally comprise adjusting the second boundary of the first window towards the first boundary of the first window if a previously attempted PS-Poll transmission and corresponding data transmission cannot be completed during the medium grant duration. Further, the method 1000 may additionally comprise adjusting the second boundary of the first window away from the first boundary of the first window if a previously attempted PS-Poll transmission and corresponding data transmission are completed during the medium grant duration.

In at least some embodiments, the method 1000 may additionally comprise adjusting a first boundary of the second window and fixing a second boundary of the second window. The method 1000 may additionally comprise adjusting the first boundary of the second window away from the second boundary of the second window if a previously attempted PS-Poll transmission during the second window is not successfully acknowledged. The method 1000 may additionally comprise adjusting the first boundary of the second window towards the second boundary of the second window if a previously attempted PS-Poll transmission during the second window is successfully acknowledged.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
an access point; and
a station in communication with the access point, the station having at least two network technology subsystems subject to coexistence interference,
wherein the station selectively implements bounded Power-Save-Polling (BPS) logic to handle communications between the station and the access point,
wherein the BPS logic operates to confine a plurality of PS-Poll transmissions to one of two separate windows during a medium grant duration of the station,
wherein during each of the separate windows one or more of the plurality of PS-Poll transmissions may be transmitted at an arbitrary time,
wherein the first window has a first boundary approximately aligned with a start of the medium grant duration and a second boundary that is adjustable, and
wherein the second boundary is adjusted towards the first boundary if a previously attempted PS-Poll transmission and corresponding data transmission cannot be completed during the medium grant duration.

2. A system, comprising:
an access point; and
a station in communication with the access point, the station having at least two network technology subsystems subject to coexistence interference,
wherein the station selectively implements bounded Power-Save-Polling (BPS) logic to handle communications between the station and the access point,
wherein the BPS logic operates to confine a plurality of PS-Poll transmissions to one of two separate windows during a medium grant duration of the station,
wherein during each of the separate windows one or more of the plurality of PS-Poll transmissions may be transmitted at an arbitrary time,
wherein the first window has a first boundary approximately aligned with a start of the medium grant duration and a second boundary that is adjustable, and
wherein the second boundary is adjusted away from the first boundary if a previously attempted PS-Poll transmission and corresponding data transmission are completed during the medium grant duration.

3. A system, comprising:
an access point; and
a station in communication with the access point, the station having at least two network technology subsystems subject to coexistence interference, wherein the station selectively implements bounded Power-Save-Polling (BPS) logic to handle communications between the station and the access point, wherein the BPS logic operates to confine a plurality of PS-Poll transmissions to one of two separate windows during a medium grant duration of the station, The system of claim 1 wherein the BPS logic maintains a first window of said two separate windows in the medium grant duration, the first window being used to control when a PS-Poll is transmitted so that a data transmission is completed during the medium grant duration, wherein during each of the separate windows one or more of the plurality of PS-Poll transmissions may be transmitted at an arbitrary time, wherein the BPS logic maintains a second window of said two separate windows in the medium grant duration, the second window being used to control when a PS-Poll is transmitted if a PS-Poll transmission cannot be completed during the first window, and wherein the second window has a first boundary that is adjustable and a second boundary that is fixed, the second boundary being determined by a predetermined end of the medium grant duration and a PS-Poll-ACK-CTS2Self sequence duration.

4. The system of claim 3 wherein the first boundary is adjusted towards the second boundary if a previously attempted PS-Poll transmission during the second window is successfully acknowledged.

5. The system of claim 3 wherein the first boundary is adjusted away from the second boundary if a previously attempted PS-Poll transmission during the second window is not successfully acknowledged.

6. A communication device, comprising:

a transceiver with a first wireless technology subsystem and a second wireless technology subsystem, the first and second wireless technology subsystems being subject to coexistence interference, wherein, to avoid an avalanche effect and improve channel utilization, the transceiver comprises logic that selectively bounds Power-Save (PS)-Poll transmission starts to one of two separate windows of a medium grant duration of the communication device, and wherein during each of the separate windows one or more of the plurality of PS-Poll transmissions may be transmitted at an arbitrary time, wherein the logic comprises a boundary controller that determines a first boundary and a second boundary for a first window of said two separate windows, the first boundary being fixed and the second boundary being adjustable, and wherein boundary controller adjusts the second boundary towards the first boundary if a previously attempted PS-Poll transmission and corresponding data transmission cannot be completed during the medium grant duration, and wherein boundary controller adjusts the second boundary away from the first boundary if a previously attempted PS-Poll transmission and corresponding data transmission are completed during the medium grant duration.

7. A communication device, comprising:

a transceiver with a first wireless technology subsystem and a second wireless technology subsystem, the first and second wireless technology subsystems being subject to coexistence interference, wherein, to avoid an avalanche effect and improve channel utilization, the transceiver comprises logic that selectively bounds Power-Save (PS)-Poll transmission starts to one of two separate windows of a medium grant duration of the communication device, and wherein during each of the separate windows one or more of the plurality of PS-Poll transmissions may be transmitted at an arbitrary time, wherein the logic comprises a boundary controller that determines a first boundary and a second boundary for a first window of said two separate windows, the first boundary being fixed and the second boundary being adjustable, and wherein the boundary controller determines first and second boundaries for a second window of said two separate windows, the first boundary being adjustable and the second boundary being fixed.

8. The communication device of claim 7 wherein boundary controller fixes the second boundary based on a predetermined end of the medium grant duration and a PS-Poll-ACK-CTS2Self sequence duration.

9. The communication device of claim 7 wherein the boundary controller adjusts the first boundary towards the second boundary if a previously attempted PS-Poll transmission during the second window is successfully acknowledged, and wherein the boundary controller adjust the first boundary away from the second boundary if a previously attempted PS-Poll transmission during the second window is not successfully acknowledged.

10. A method for a communication device, comprising:

limiting Power-Save (PS)-Poll transmissions to one of two separate windows in a medium grant duration of the communication device;

if a PS-Poll is not transmitted during a first window of said two separate windows, then transmitting a PS-Poll during a second window of said two separate windows;

fixing a first boundary of the first window and adjusting a second boundary of the first window;

wherein adjusting the second boundary of the first window comprises adjusting the second boundary towards the first boundary if a previously attempted PS-Poll transmission and corresponding data transmission cannot be completed during the medium grant duration, and adjusting the second boundary away from the first boundary if a previously attempted PS-Poll transmission and corresponding data transmission are completed during the medium grant duration.

11. A method for a communication device, comprising:

limiting Power-Save (PS)-Poll transmissions to one of two separate windows in a medium grant duration of the communication device;

if a PS-Poll is not transmitted during a first window of said two separate windows, then transmitting a PS-Poll during a second window of said two separate windows; and adjusting a first boundary of the second window and fixing a second boundary of the second window comprising adjusting the first boundary away from the second boundary if previously attempted PS-Poll transmission during the second window is not successfully acknowledged, and adjusting the first boundary towards the second boundary if a previously attempted PS-Poll transmission during the second window is successfully acknowledged.

* * * * *